Patented Apr. 22, 1930

1,755,667

UNITED STATES PATENT OFFICE

KARL SCHIRMACHER AND KARL EISHOLD, OF HOCHST-ON-THE-MAIN, GERMANY, ASSIGNORS TO GENERAL ANILINE WORKS, INC., OF NEW YORK, N. Y., A CORPORATION OF DELAWARE

VAT DYESTUFF

No Drawing. Application filed May 22, 1928, Serial No. 279,846, and in Germany May 30, 1927.

Our present invention relates to new sulfur-containing vat dyestuffs, more particularly to dyestuffs containing the following general atomic grouping:

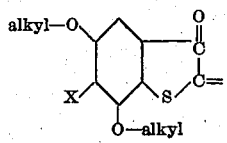

wherein X stands for hydrogen or halogen.

We have found that valuable dyestuffs of the thioindigo series and of the thionaphthene-indolindigo series are obtained by converting an oxythionaphthene of the general formula:

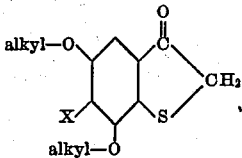

wherein X stands for hydrogen or halogen, by the action of an oxidizing agent into the symmetrical thioindigo dyestuff or causing it to react with such a body as is capable of forming vat dyestuffs with oxythionaphthenes as for instance an ortho-diketone or an α-derivative therof.

The dyestuffs may also be prepared by first transforming the new oxythionaphthenes into their α-derivatives, for instance by means of nitrosodimethylaniline into the 2-aniles, and then causing the latter to react with a compound containing a reactive methylene group, for example an oxythionaphthene, an indoxyl or the like.

The new dyestuffs correspond to the following general formula:

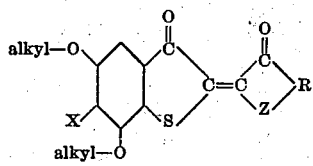

wherein X stands for hydrogen or halogen, Z for sulfur or the NH-group and R for an aromatic residue of the benzene-, naphthalene- or anthracene series which may be substituted in any manner.

The new dyestuffs are distinguished by a remarkable fastness to washing, light and chlorine.

The dialkoxy-hydroxythionaphthenes used in the process of this invention have hitherto been unknown. They can be prepared in an easy and smooth reaction in the following manner:

By treating the 3.5-dihydroxybenzoic acid with an alkylating agent the corresponding alkoxybenzoic acid is obtained. The latter is nitrated, the nitro group entering the ortho-position to the carboxyl group.

The dialkoxyl-nitro-benzoic acid thus obtained of the general formula:

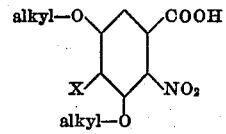

wherein X stands for hydrogen or a halogen, is reduced to the corresponding substituted amino compound and the latter is transformed into the correspondingly substituted aryl-thio-glycolcarboxylic acid. This dialkoxy-phenyl-thioglycolcarboxylic acid of the general formula:

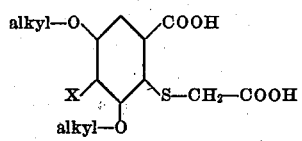

wherein X stands for hydrogen or a halogen, is transformed into the alkoxy-oxythionaphthene by treating it with an alkaline condensing agent as for instance caustic soda, and splitting off carbon dioxide from the dialkoxy-oxythionaphthene-carboxylic acid, which is at first formed, by means of an acid agent, or by treating it with acetic anhydride and subsequently splitting off the acetyl group which has entered.

The 5.7-dimethoxy-3-oxythionaphthene can for example be prepared in the following manner:

By nitrating 3.5-dimethoxy-benzoic acid, the 3.5-dimethoxy-2-nitro-benzoic acid of the formula:

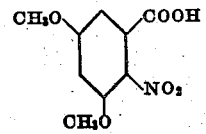

is obtained. It forms in a pure state nearly colorless crystals melting at 232° C. On storage the crystals quickly assume at first a yellow and afterwards a turbid green coloration.

The said nitro-carboxylic acid is reduced in the usual manner to the 3.5-dimethoxy-2-amino-carboxylic acid, which crystallizes from alcohol in the form of nearly colorless needles melting at 189° C. to 190° C.

The 3.5-dimethoxy-phenyl-2-thioglycol-1-carboxylic acid obtainable therefrom of the formula:

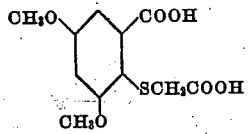

crystallizes from water in the form of colorless needles. The compound melts at 105° C., to 107° C., probably while losing crystal water, then re-solidifies and melts again at 128° C. to 130° C.

This thioglycol-carboxylic acid is transformed in known manner into the 5.7-dimethoxy-3-oxythionaphthene of the formula:

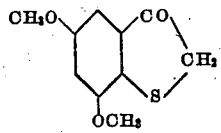

It crystallizes from dilute alcohol in the form of fine yellowish needles melting at 143° C. It dissolves in alcohol and glacial acetic acid with a green, in benzene with a blue fluorescence.

The 5.7-diethoxy-3-oxythionaphthene of the formula:

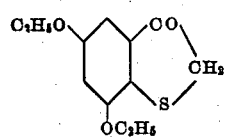

is prepared in the same manner by starting from the 3.5-diethoxy-benzoic acid. It crystallizes from dilute acetic acid in the form of yellowish laminæ melting at 103° C.

The dialkoxyl-halogen-phenyl-thioglycol-carboxylic acids of the general formula:

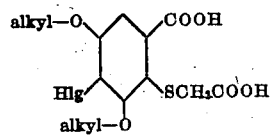

are obtained by treating with a halogenating agent the dialkoxyl-phenyl-thioglycol-carboxylic acids or the corresponding substituted starting products.

Thus the 3.5-dimethoxy-4-bromo-phenyl-2-thioglycol-1-carboxylic acid of the formula:

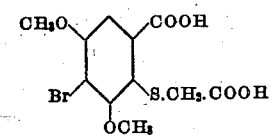

is for example prepared by treating the 3.5-dimethoxy-phenyl-2-thioglycol-1-carboxylic acid with bromine. It crystallizes from water in the form of colorless needles melting at 182° C. to 184° C. with decomposition.

The following examples are given by way of illustration, it being understood that they are in no way limitative. The parts are by weight:

(1) 21 parts of 5.7-dimethoxy-3-oxythionaphthene of the formula:

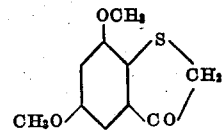

are dissolved in 18 parts of caustic soda solution of 40° Bé. and 200 parts of water. Into this solution is run, while stirring, a solution of 80 parts of potassium ferricyanide in 300 parts of water. The dyestuff separates as a fine blue precipitate. After having further stirred for half an hour, the dyestuff is filtered by suction, washed with water and dried. It has the formula:

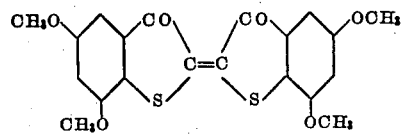

It is in a dry state a dark blue powder which dissolves in cold concentrated sulfuric acid to an orange-red solution with a like fluorescence, in warm concentrated sulfuric acid to a reddish-violet solution. The solution in nitrobenzene is pure blue.

The dyestuff forms with alkaline hydrosulfite an olive-green vat from which cotton and wool are dyed bluish-gray fast tints.

A dyestuff of similar tinctorial properties is obtained by oxidizing in the same manner 24 parts of 5.7-diethoxy-3-oxythionaphthene with potassium ferricyanide. The dyestuff has the following constitution:

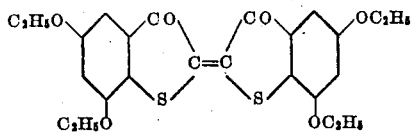

The colorations of its solutions are the same as those of the above-described methoxy derivative. In the form of a powder it has a dark blue appearance. It yields with alkaline hydrosulfite an olive-green vat from which cotton and wool are dyed bluish-gray tints.

By substituting in the above example for the 5.7-dimethoxy-3-oxythionaphthene 29 parts of 5.7-dimethoxy-6-bromo-3-oxythionaphthene there is obtained a dyestuff having the formula:

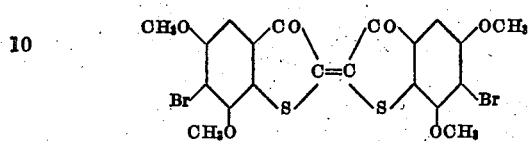

The dyestuff forms, when dried, a dark blue powder. It dissolves in cold concentrated sulfuric acid to a turbid yellowish-green solution which on heating turns into a reddish-blue. The color of the solution in nitrobenzene is greenish-blue.

By treating the dyestuff in the usual manner with an alkaline hydrosulfite solution, it forms a rather sparingly soluble and almost colorless leuco compound in which vat cotton and wool are dyed faint blue tints.

(2) 21 parts of 5.7-dimethoxy-3-oxythionaphthene and 33 parts of 2-(para-dimethylamino)-anile of 4-methyl-6-chloro-2.3-diketodihydrothionaphthene are dispersed in about 400 parts of glacial acetic acid or chlorobenzene or in another appropriate dissolving or suspending agent. The mixture is then heated, while stirring, until the formation of the dyestuff is complete. The dyestuff separates in the form of violet crystals which after cooling are filtered by suction and are boiled out with glacial acetic acid or with alcohol in order to purify them.

The dyestuff is formed according to the following equation:

powder the dyestuff is brownish-violet. It is soluble in cold concentrated sulfuric acid to a bluish-green, in warm concentrated sulfuric acid to a pure green solution. The color of its solution in nitrobenzene is reddish-violet.

(3) A mixture of 27 parts of 3.5-dimethoxy-phenyl-2-thioglycol-1-carboxylic acid, 33 parts of 2-(para-dimethylamino)-anile of 4-methyl-6-chloro-2.3-diketo-dihydrothionaphthene and 400 parts of acetic anhydride is heated for about one hour to boiling in a reflux condenser. The mixture first dissolves and solidifies after a short time to a violet crystalline magma which after cooling is filtered by suction. The dyestuff is purified by boiling with alcohol or glacial acetic acid. It is identical with that obtainable according to Example 2.

(4) 21 parts of 5.7-dimethoxy-3-oxythionaphthene and 32 parts of 2-(para-dimethylamino)-anile of 2.3-naphthoxythiophene are dispersed in about 400 parts of glacial acetic acid or chlorobenzene or in another suitable dissolving or suspending agent. The mixture is heated, while stirring, until the formation of the dyestuff is complete. The dyestuff forms grayish-violet crystals. After cooling it is filtered by suction and boiled with alcohol or glacial acetic acid so as to purify it. The formation of the dyestuff takes place according to the following equation:

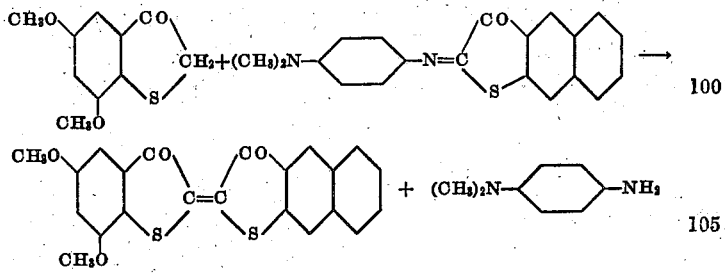

The dyestuff dissolves in concentrated sulfuric acid to a green, in nitrobenzene to a blue solution. It gives with alkaline hydrosulfites reddish-brown vats in which cotton and wool are dyed a dark bluish-gray tint.

(5) 21.6 parts of 5.7-dichlorisatin and 24 parts of phosphorus pentachloride are dispersed in 200 parts of benzene. The mixture is heated to boiling in a reflux apparatus un-

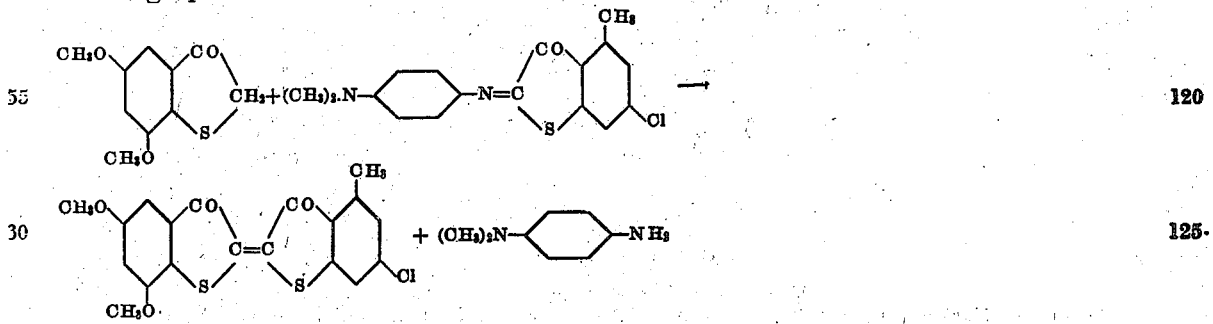

The dyestuff dyes cotton and wool from a yellowish-olive vat violet tints. In the form of a til the formation of the chloride is complete. This solution is run, while stirring, into a warm solution of 21 parts of 5.7-dimethoxy-3-oxythionaphthene in 300 parts of alcohol. The dyestuff precipitates at once in the form of violet crystals. In order to finish the condensation the mass is heated on the steam bath for half an hour. The dyestuff is filtered by suction, boiled with alcohol and dried.

The following equations shows the course of the reaction taking place in the formation of the present dyestuff:

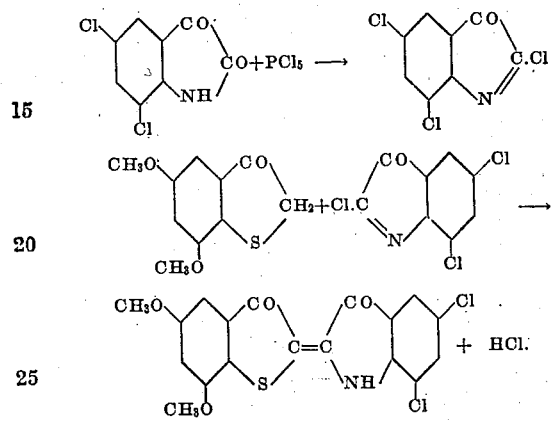

The dyestuff dissolves in concentrated sulfuric acid to a green solution, in nitrobenzene to a blue solution. It yields with alkaline hydrosulfite solution a yellow vat in which cotton and wool are dyed bluish-gray shades.

The same dyestuff is obtained by substituting for the 5.7-dichlorisatin-α-chloride used in this example an α-arylide of 5.7-dichlorisatin.

We claim:

1. As new products, the vat dyestuffs of the following general formula:

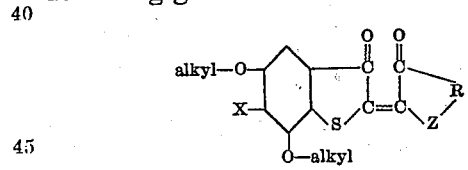

wherein X stands for hydrogen or halogen, Z for sulfur or the NH-group and R for an aromatic residue of the benzene-, naphthalene- or anthracene series which may be substituted in any manner.

2. As new products, the vat dyestuffs of the following formula:

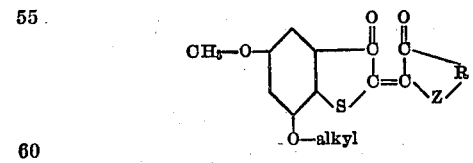

wherein Z stands for sulfur or the NH-group and R for an aromatic residue of the benzene-, naphthalene- or anthracene series which may be substituted in any manner.

3. As new products, the vat dyestuffs of the following formula:

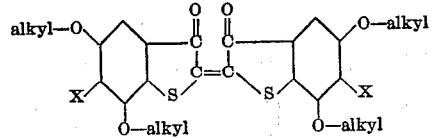

wherein X stands for hydrogen or halogen.

4. As a new product, the vat dyestuff of the following formula:

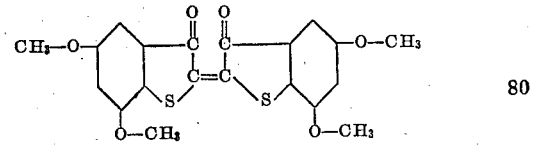

being a dark-blue powder, forming with alkaline hydrosulfite an olive-green vat, from which cotton and wool are dyed bluish-gray fast tints.

In testimony whereof, we affix our signatures.

KARL SCHIRMACHER.
KARL EISHOLD.